(No Model.) 2 Sheets—Sheet 2.

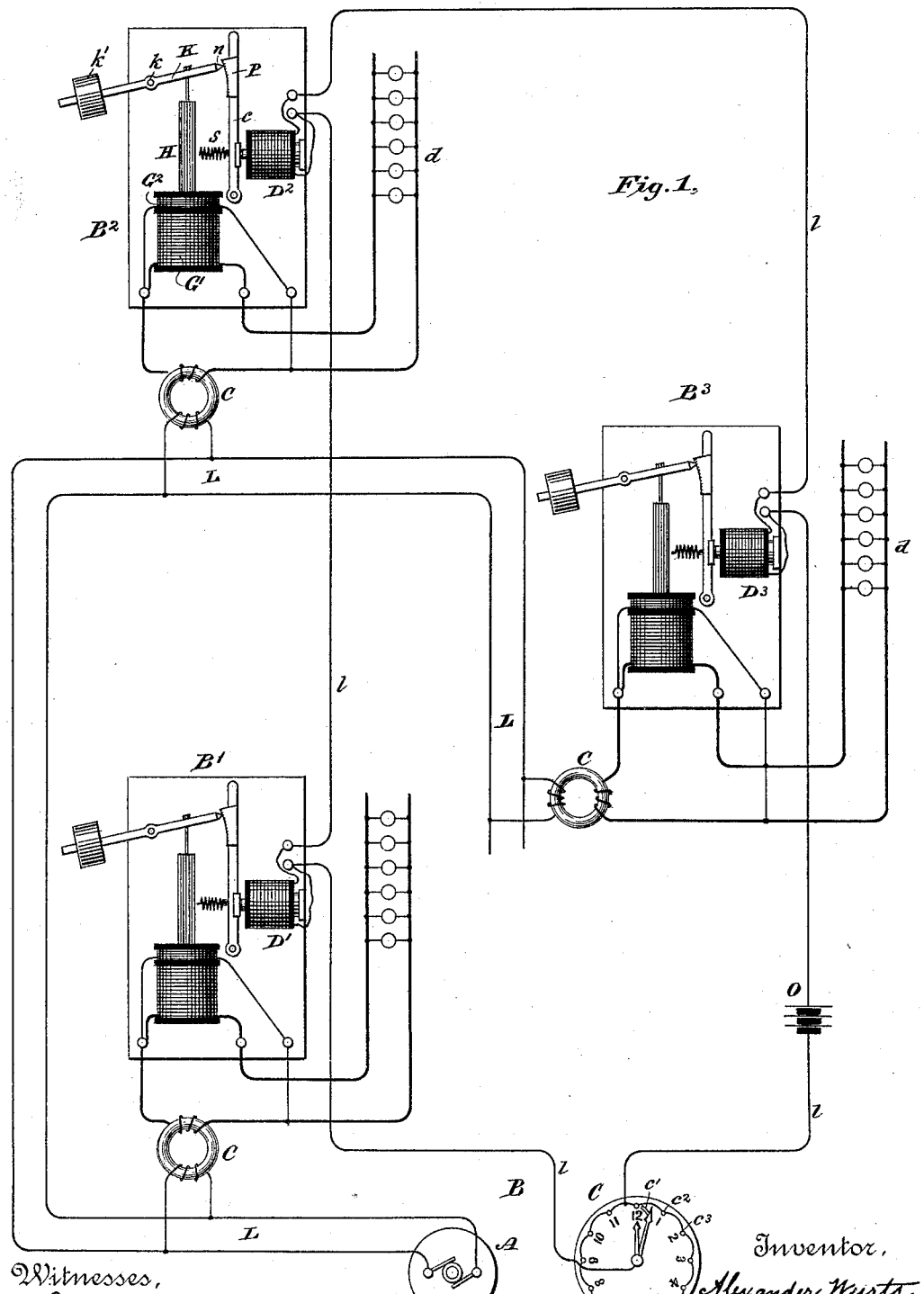

A. WURTS.
SYSTEM OF ELECTRIC METERS.

No. 392,577. Patented Nov. 6, 1888.

Witnesses,
Geo. W. Breck
Edward Thorpe

Inventor,
Alexander Wurts
By his Attorneys
Pope Edgecomb & Perry

UNITED STATES PATENT OFFICE.

ALEXANDER WURTS, OF PITTSBURG, PENNSYLVANIA, ASSIGNOR TO THE WESTINGHOUSE ELECTRIC COMPANY, OF SAME PLACE.

SYSTEM OF ELECTRIC METERS.

SPECIFICATION forming part of Letters Patent No. 392,577, dated November 6, 1888.

Application filed January 21, 1888. Serial No. 261,459. (No model.)

*To all whom it may concern:*

Be it known that I, ALEXANDER WURTS, a citizen of the United States, residing in Pittsburg, in the county of Allegheny, in the State of Pennsylvania, have invented certain new and useful Improvements in System of Electric Meters, (Case No. 200,) of which the following is a specification.

The invention relates to an organization of circuits and apparatus for indicating or measuring the currents consumed at different points in a system of electrical distribution.

The object of the invention is to provide convenient means whereby a system of meters may be controlled from one central point, so that each meter instead of being provided with separate actuating mechanism—such, for instance, as clock-works—may receive periodically from the central point or station the requisite impulses for effecting the indications or registration.

In carrying out the invention there is placed at the central station a suitable circuit-controlling device which will operate periodically to send electrical impulses to each individual station, and there set in operation the recording device or meter. The magnetism developed by such impulses at the several stations is employed to accumulate the mechanical power necessary to operate the meters.

Any suitable form of meter may be adapted to the purposes of the invention, thus a meter which will set itself in position to indicate at any given moment the current traversing the circuit.

The invention will be described more particularly in its relation to a device described and claimed in an application of Philip Lange, of even date herewith, but I make no claim to the construction of the meter itself.

Figure 3:
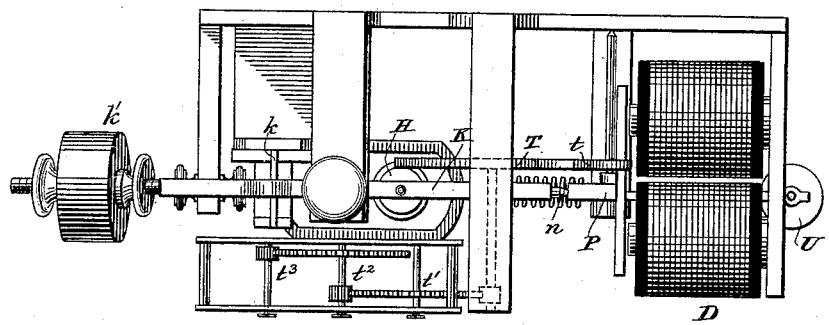
Figure 2:
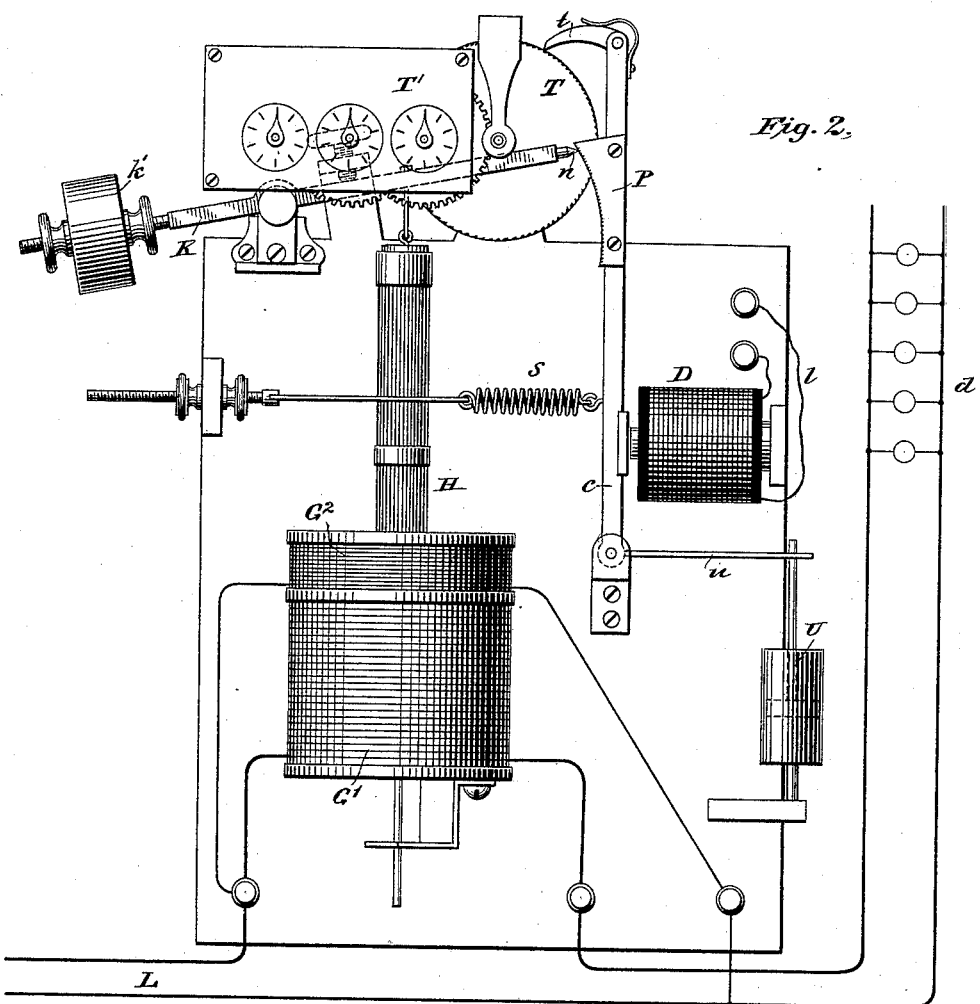

In the accompanying drawings, Figure 1 is a diagram showing the general organization of the circuits and apparatus. Figs. 2 and 3 are respectively a side elevation and a plan of an individual instrument.

Referring to the figures, A represents a suitable source of electric currents, and L its circuit. The conductor L leads to the several stations represented at B' B², &c. A second conductor, $l$, leads from the central station, B, to the stations B' B², &c. In this conductor there is included at the central station a suitable automatic circuit-controlling device, such as is shown at C, for instance. This operates to close the circuit-connections of a battery or other suitable source of electricity, as indicated at O, at stated intervals—for instance every five minutes, or other desired times. This device C may consist of a mechanical clock-train having a circuit-closing attachment of any well-known character, such as is graphically represented by the contact-arm $c'$ and contact-points $c^2 c^3 c^4$, &c., located at the proper intervals. The arm $c'$ is connected with one pole of the source O, while the several points are connected together and with the line $l$, which returns to the opposite pole of the source O. In the conductor $l$ there is included at each station an electro-magnet, as shown at $D' D^2$, &c. These are employed for setting in operation or controlling the meters at the different stations.

A convenient form of meter and method of applying the invention thereto is shown in connection with Figs. 2 and 3. Each meter consists of two coils, $G'$ and $G^2$, the former of which is included in series with the translating devices $d\ d$, supplied, in this instance, through converters C C, from the circuit L, while the coil $G^2$ is included in shunt-circuit upon the devices. These coils are provided with a core, H, preferably of soft-iron wires electrically insulated from each other. The core is suspended from a lever, K, which is carried upon a knife-edge or pivot, $k$. A counterpoise, $k'$, is adjustable upon the lever and serves to balance both the weight of the core and the pull exerted by the current traversing the shunt-coil $G^2$. The lever K carries a point or knife-edge, $n$, which moves in front of the face of a curved plate, P, as the core is moved within the coils. This plate P is carried upon a lever, $c$, of the electro-magnet D. The face of the plate is indented, roughened, or corrugated, so that the point will not slip along its surface when the two are in contact. A spring or weight, $s$, tends to hold the lever away from its magnet, with the plate resting against the point. When the magnet is vitalized, the point is released by a very slight movement of the lever $c$. The lever K thereupon adjusts itself to whatever position the coil $G^2$ may require. Upon the interruption of the current through the magnet D the lever $c$ will move under the influence of the spring or weight $s$ until the plate P comes against the point $n$ at the end of the lever K. Upon the lever $c$ there is carried a pawl, $t$, which engages the teeth of a wheel, T. This wheel therefore will be turned a distance dependent upon the movement of the lever from its magnet, and therefore since this movement is greater or less, accordingly as the core H is drawn a greater or less distance into the coils $G'$ and $G^2$, a corresponding registration will be made upon the train $T^v$. This train it is evident may be of any suitable character. That here shown consists of three dials having indicators driven through suitable gear-wheels or pinions, as shown at $t'\ t^2\ t^3$. It is obvious that by varying the form of the curve of the plate P the rate of movement of the wheel T may be varied and the apparatus thereby adapted to the requirements of any particular case. The registration which is performed by the dials may be made to show the ampère-hours, the lamp-hours, or the money value directly by varying the ratio of the current-unit to the teeth upon the wheel T, or to the gear-wheels.

When the meter is out of circuit and no current is being consumed, the lever K will rest against the upper portion of the curved plate P, and this will prevent any movement of the lever $c$ sufficient to carry forward the recording-wheel T.

For the purpose of steadying the movements of the lever $c$, and to prevent any movement from a sudden jarring of the device, a suitable dash-pot, U, may be applied to the extension $u$ of the lever $c$.

I claim as my invention—

In a system of electrical distribution having two or more sub-stations supplied from a central station, the combination of a series of electric meters, one located at each sub-station, an actuating or setting coil for each meter connected in the main distributing-circuit, or in circuits derived therefrom, whereby the movable element of each meter is set in a position directly dependent upon the current traversing its circuit, registering devices for the respective meters, electro-magnets for periodically actuating the respective registering devices, and a special independent circuit running throughout the entire system and including said electro-magnets, but otherwise independent of the meters, whereby the electro-magnets may be periodically vitalized.

In testimony whereof I have hereunto subscribed my name this 24th day of December, A. D. 1887.

ALEXANDER WURTS.

Witnesses:
W. D. UPTEGRAFF,
CHARLES A. TERRY.